(No Model.)

E. R. E. COWELL.
TIME CHART.

No. 445,392. Patented Jan. 27, 1891.

Witnesses:
P. M. Hulbut
A. M. O'Dogherty

Inventor:
Edward R. E. Cowell
By Thos. S. Sprague & Son
Atty.

UNITED STATES PATENT OFFICE.

EDWARD R. E. COWELL, OF YPSILANTI, MICHIGAN, ASSIGNOR OF ONE-HALF TO HENRY P. GLOVER, OF SAME PLACE.

TIME-CHART.

SPECIFICATION forming part of Letters Patent No. 445,392, dated January 27, 1891.

Application filed June 23, 1890. Serial No. 356,321. (No model.)

*To all whom it may concern:*

Be it known that I, EDWARD R. E. COWELL, a citizen of the United States, residing at Ypsilanti, in the county of Washtenaw and State of Michigan, have invented certain new and useful Improvements in Time-Charts, of which the following is a specification, reference being had therein to the accompanying drawings.

This invention relates to new and useful improvements in time-charts; and the invention consists in applying to a map marked with the meridians arranged at specified distances apart a movable strip slidingly secured to the map or chart and marked with the divisions of time corresponding with the time intervals between the meridians; also so arranged that by registering a given meridian at a given hour the corresponding time of all other meridians will be indicated.

The invention further consists in the combination and arrangement of the various parts, as more fully hereinafter pointed out, and shown in the accompanying drawings, in which—

Figure 1:
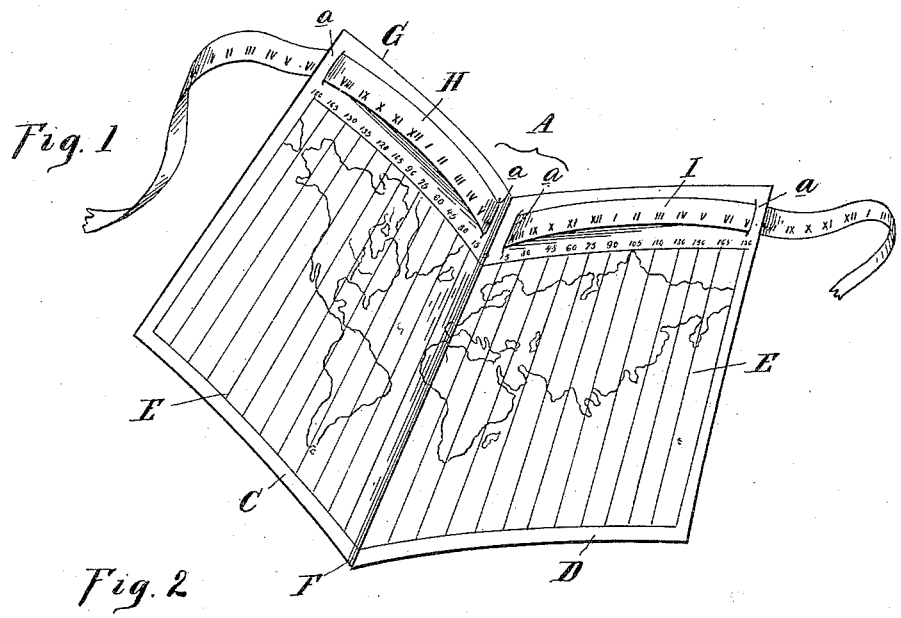
Figure 2:
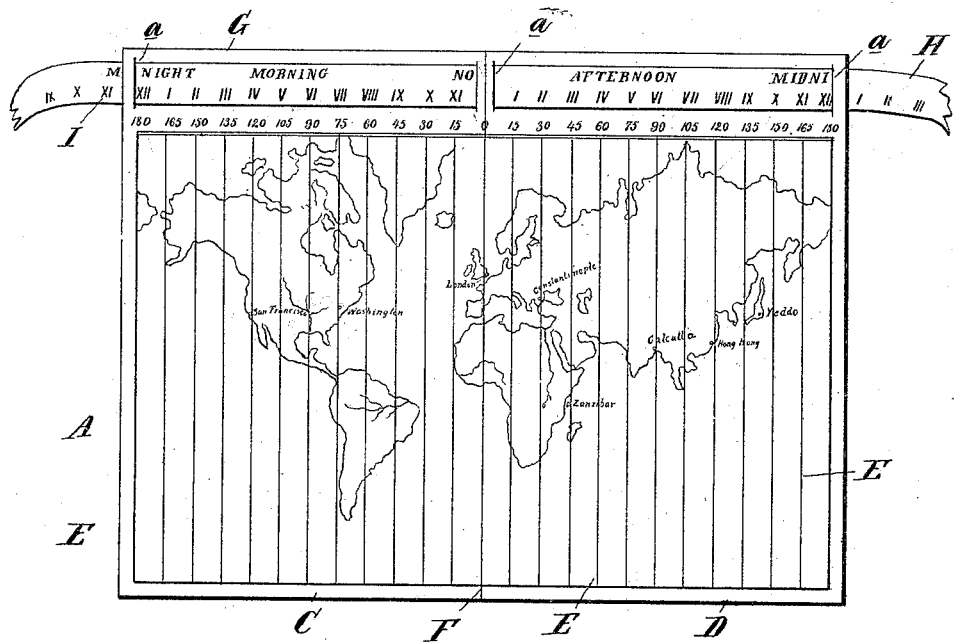

Figure 1 is a perspective view of my device partly closed, and Fig. 2 is a plan view thereof.

A is a suitable back, preferably of paper, and consisting of two leaves C and D folded centrally to form two leaves. Upon this back or sheet of paper is printed a map of the world extending to near the top, and also the meridians E, arranged at stated intervals apart and marked in degrees the distance from the standard meridian, such as Greenwich.

I preferably make the central or standard meridian upon the line F, at which the map is folded.

Above the map is the space G, over which is slidingly secured the strip H. This strip I secure to the back preferably by forming slits *a* at suitable intervals and pass a flexible ribbon therethrough, as plainly shown in the drawings. Upon this strip is marked two series of figures I from 1 to 12, indicating the hours of the day. In the normal position of the device the central figure 12 is over the central or standard meridian, and the figure 12 at each edge is over the one hundred and eightieth meridian or the greatest distance from the middle. I also mark this strip with the divisions of the day, as night, morning, noon, and afternoon, the distance between the figures indicating the hours of the day corresponding with the distance upon the meridians upon the map. The meridians are preferably arranged that every fifteen degrees indicated an hour of sun time and the time intervals corresponding therewith would indicate the hours of the day.

The use of the device is especially intended for travelers on shipboard or elsewhere to ascertain the time at any point of the world after ascertaining their own location in degrees of longitude. For instance, if that traveler finds himself upon the sixtieth degree of east longitude at noon of a given day, by moving the strip carrying the hours of the day until the figure 12, marked "noon," was over this sixtieth degree, the other hours upon the strip would register meridians upon the map and indicate the time at these meridians at the same moments.

It is evident that the strip may be moved along this to indicate to the traveler crossing mid-ocean the time in any part of the world corresponding to the hour at which he makes the adjustment of the strip upon the map.

In making my device I will preferably arrange the meridians to indicate the hours, half-hours, and quarter-hours, and mark the strip to indicate the same divisions of time.

By making the article in the shape of a two-leaf book I am enabled to bring the fold at the standard meridian, and thus put it in compact shape and enable the user to more readily adjust the device east or west from the central point.

What I claim as my invention is—

1. In a time-chart, the combination of a map on Mercator's projection, having the meridians marked thereon at intervals both ways from the standard meridian, and a sliding strip marked with divisions of time corresponding to the intervals between the meridians and slidingly secured in the chart by passing through the same at intervals, substantially as described.

2. In a time-chart, the combination, with a map on Mercator's projection, having the meridians marked thereon, of a sliding strip marked with divisions of time corresponding to the time intervals between the meridians and secured in position by passing through slits in the chart beyond the map, substantially as described.

In testimony whereof I affix my signature in presence of two witnesses.

EDWARD R. E. COWELL.

Witnesses:
M. B. O'DOGHERTY,
JAMES WHITTEMORE.